United States Patent [19]

Rando et al.

[11] Patent Number: 4,939,356
[45] Date of Patent: Jul. 3, 1990

[54] BAR CODE SCANNER WITH ASTERISK SCAN PATTERN

[75] Inventors: Joseph F. Rando, Los Altos Hills, Calif.; H. Nick Roberts; John F. O'Brien, both of Eugene, Oreg.

[73] Assignee: Spectra-Physics, Inc., San Jose, Calif.

[21] Appl. No.: 346,434

[22] Filed: May 2, 1989

[51] Int. Cl.⁵ .............................. G06K 7/10
[52] U.S. Cl. .................... 235/467; 235/470; 235/472
[58] Field of Search ............... 235/467, 470, 472

[56] References Cited

U.S. PATENT DOCUMENTS

| | | |
|---|---|---|
| 3,978,317 | 8/1976 | Yamaguchi . |
| 4,192,542 | 3/1980 | Hashimoto ............... 235/467 |
| 4,369,361 | 1/1983 | Swartz . |
| 4,413,177 | 11/1983 | Godwin . |
| 4,639,070 | 1/1987 | Ikeda . |
| 4,699,447 | 10/1987 | Howard . |
| 4,760,248 | 7/1988 | Swartz . |
| 4,795,224 | 1/1989 | Goto . |
| 4,808,804 | 2/1989 | Krichever . |
| 4,816,661 | 3/1989 | Krichever . |

Primary Examiner—Harold I. Pitts
Attorney, Agent, or Firm—Donald C. Feix; Paul Davis; Thomas M. Freiburger

[57] ABSTRACT

A bar code scanner which preferably generates an asterisk-like scan pattern has a scanner head at the end of a flexible mount enabling operator personnel to orient the scanner head in virtually any position and direction. The scan pattern generator is compact in size, utilizing a laser diode as a source, so that the scan head is easily manipulated to the desired position. In preferred embodiments the scanning mechanism generates the asterisk scan pattern with a rotating mirror or mirrors and a series of peripheral mirrors or lenses, one for each scan line, in an efficient and compact arrangement. The entire asterisk scan pattern may be constantly rotated at a relatively slow rate, so that bar code labels are more likely to be read without deliberate orientation by the operator, particularly in the case of bar codes of high aspect ratio.

45 Claims, 9 Drawing Sheets

FIG. 17

BAR CODE SCANNER WITH ASTERISK SCAN PATTERN

BACKGROUND OF THE INVENTION

This invention is in the field of automatic label readers, and is particularly concerned with bar code readers for situations wherein an operator moves a bar coded article to or past a label reader, such as in a point-of-sale application.

In previous non-hand-held laser bar code scanners, the scanners have been inflexible in mounting, such that once in place they could not be moved. Also, on most such scanners, the method and location for presenting a labeled item or package to the scanner for the best read has not been clear to the operator. In some scanners there has not been any one best read position.

Previous label scanners have required a considerable amount of volume and space, such as counter space in a point-of-sale arrangement. Generally, scanning optics have not been sufficiently compact to enable versatility in the location of the scanner and flexibility in the positioning, aim and use of a scanner, as are made possible by the bar code scanner of the present invention as described below.

SUMMARY OF THE INVENTION

Bar code label scanners in accordance with the present invention provide a very, flexible mounting arrangement which enables a saving in volume and space, much simpler installation of a scanner in a point-of-sale arrangement, and adjustable aim and positioning of the scanner head for maximum convenience, for ease of use and for comfort to the particular operator indicate to the operator where to put the label in moving the bar coded item or package to or past the scanner head.

Further, in a particular embodiment of the invention, compact scan pattern generating optics include an arrangement of optical elements which substantially reduces the scanner size as well as the complexity and cost of manufacture of the scanner. Scanner heads of no greater than 3½ inches diameter and about 3½ inches depth have been built and have proven effective.

In one important aspect, the invention is concerned with versatility in positioning and in adjusting the aim of a bar code scanner, such that an operator can easily position the scanner and adjust its aim for his own maximum convenience, comfort, accuracy and speed. These are particularly important features for scanning at point-of-sale locations and other locations.

Accordingly, in one embodiment a compact, versatile laser bar code scanner in accordance with the invention includes a scanner head having means for scanning a laser beam generally in a fixed or rotating asterisk-like pattern focused a distance in front of the head such that a package can be moved to or past the scanner head to conveniently scan a bar code label on the package with the scanner, substantially without the need for label orientation by the user. By 'asterisk' or "asterisk-like" scan pattern is meant a scan geometry werein a plurality of nonparallel scan lines generally intersect at a center locus, though they may not actually have a common intersection point as in an ideal asterisk. There may be a center dark area or areas defined by the scan pattern, among scan line intersections. The term includes patterns with scan lines which can be somewhat curving rather than straight. An example of a bar code scanner producing an asterisk-like pattern is shown in U.S. Pat. No. 4,699,447, assigned to the same assignee as the present invention.

A flexible scanner head support means in the preferred embodiment of the present invention is connected to the scanner head, for adjusting the position and angle of the head in three-dimensional space. At the other end of the flexible support means is a base capable of resting on a counter or other surface, or the counter or a wall can serve as the base.

The flexible head support means may comprise a gooseneck type flexible column, or other types of flexible column, such as the type with a plurality of pivot joints in different axis orientations. Alternatively, the scanner head can be independently mounted to some convenient fixed location (no flexible head support means).

A laser diode preferably is used as a laser source in compact scanners in accordance with the invention. The laser diode is positioned in the scanner head, or directly adjacent to the scanner head.

There may be included fiber optic means for conducting return collected light through the flexible head support means, with decoding electronics in a separate base unit for receiving the return collected light from the fiber optic means.

A second very important aspect of the invention, with or without the flexible head support means, involves the scanning optics which achieve compactness of the scanner head and reliability and speed in the reading of bar code labels. To a great degree the improved scanning optics in accordance with the present invention are relied upon to achieve the versatility and adjustability of the scanning head described above. This is because compactness, lightness in weight and efficiency in bar code reading characteristics are necessary elements to the provision of a relatively small, adjustable scanner head which can be located and oriented in a number of different positions as desired by the operator.

In one preferred embodiment, the scanner head generates an asterisk scan pattern and comprises a scanner body, a laser diode in the scanner body as a laser source, and a rotating mirror positioned obliquely in the path of the laser diode's beam, producing a sweeping generally radial beam of light. Further along the path of the beam beyond the rotating mirror is an optical means (lens or mirror) for focusing the beam and for redirecting it generally in the direction of the region where the asterisk scan pattern is to be produced. The beam then strikes sequentially a series of optical elements positioned in an arcuate array, around the circumference of a circle or semicircle each of which may have means for magnifying the length of scan of the incoming scanned beam to achieve the desired scan lines in the asterisk pattern as the beam sweeps across each optical element in succession in each revolution of the rotating mirror.

The optical means in the path of the beam in one preferred embodiment comprise a focusing lens mounted on a rotating arm, on which the rotating mirror is also mounted, for focusing the beam to a waist, and a peripheral mirror mounted obliquely on the arm at an outward position, for redirecting the beam generally through the center portion of each optical element positioned in an arcuate array to direct the beam in the direction of the region where the asterisk scan pattern beam is produced. The optical elements may comprise an array of positive lenses positioned in an arcuate pattern about the axis of rotation of the arm and not rotatable with the arm. The positive lenses receive segments of the sweeping beam from the rotating peripheral mirror and project from each positive lens a magnified scan line as a component of the asterisk scan pattern.

There may be included a pattern rotating means for rotating the asterisk scan pattern as it is generated. This can comprise a bearing-mounted rotation member upon which the arcuate array of optical elements are mounted, with a motor for rotating the rotation member at a relatively slow rate of speed, such as about 30 rpm. This rotates the asterisk scan pattern at a rate to substantially assure that a bar code of high aspect ratio will be read when moved to or through the asterisk scan pattern at a normal rate of movement, without the need for deliberate label orientation by the operator.

In another preferred embodiment, the scanner optics of the scanner again include a rotating mirror positioned obliquely in the path of the laser beam from the laser diode, rotating on an axis which passes generally through the asterisk scan pattern. In this embodiment there is an array of mirrors (rather than lenses) obliquely positioned around the axis of rotation such that they receive the sweeping beam of light from the rotating mirror and reflect the light to generate the asterisk scan pattern, with each mirror of the array generating a scan line of the asterisk pattern.

In an optional but important aspect of the invention, in a three-reflection embodiment, a center rotating mirror and a final reflecting mirror (with a mirror array between) are so positioned and oriented as to substantially remove all curvature from the scan lines produced. Reflecting surfaces are oriented so as to complement each other, cancelling curvature and producing straight lines.

It is therefore among the objects of the present invention to improve over previous bar code scanning apparatus for particular applications, by providing a compact scanner mechanism contained in a compact scanner head and preferably flexibly mounted from a base, such that the entire scanner apparatus can be located as desired and the scanner head can be positioned and angled for best use by a particular operator.

Scanner optics for achieving a compact head design and straight scan lines and for efficiency of construction of the scanner head and reliability and speed of reading also constitute important objects of the invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
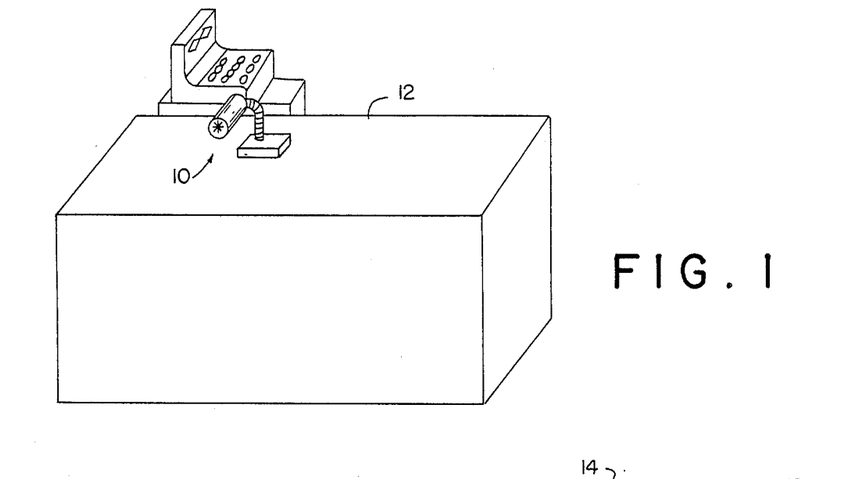
FIG. 1 is a perspective view showing a compact and adjustable-position laser bar code scanner according to the invention, positioned on a counter (such as for point-of-sale) and with the scanner head aimed, for convenient use of an operator.

In the drawings, FIG. 1 shows a preferred embodiment of a compact and adjustable bar code label scanner 10 in accordance with the principles of the invention. The scanner device 10 is shown placed on a counter 12 or a surface adjacent to a counter of a retail check stand, in the case of use as a point-of-sale label scanner.

The scanner 10 includes a scanner head 14, an adjustable neck 16 or flexible support for the scanner head, and a base 18 to which the lower end of the adjustable support or neck 16 is affixed. The base 18 can comprise a relatively small, weighted base as shown, for firmly anchoring the unit 10 in the case of the preferred construction illustrated wherein the unit is movable; or it can comprise a portion of the counter 12 or table or other built-in structure, if the unit 10 is to be permanently mounted at a work location.

As indicated in FIG. 1, the scanner head 14 can be adjusted as to its aim or pointing direction and as to its position, within limits of movement of the adjustable supporting neck 16. This is to enable an operator to orient and position the head 14 as he desires, in the most comfortable and convenient position for the particular operator to move bar code labeled packages to or past the scanner head.

Figure 2:
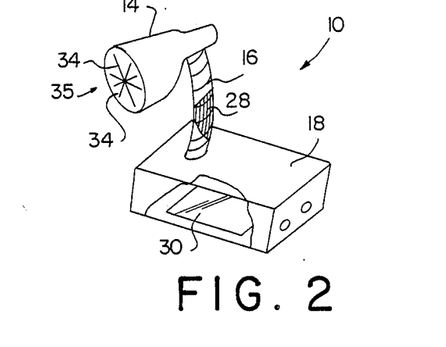
FIG. 2 is a larger view of the bar code scanner device shown in FIG. 1.
Figure 3:
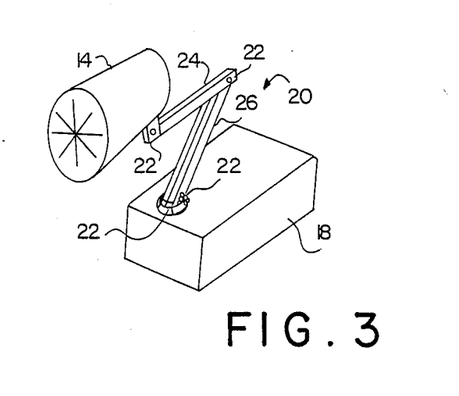
FIG. 3 is a view showing another embodiment of the scanner shown in FIGS. 1 and 2, in particular with a different form of adjustable support for the scanner head.

FIG. 2 illustrates that in a preferred construction, the adjustable head-supporting neck 16 may comprise a goose neck type support of the kind fabricated from thin metal strips formed into circles and connected together or formed of a continuous spiraling metal strip. Another type of flexible support 20 is shown in FIG. 3, with a series of pivots or hinges 22 on axes which include different orientations, including a swivel base pivot 22 on a vertical axis. The pivots connect structural members 24 and 26.

In either event, the scanner head 14 preferably includes all of the beam delivering scanner optics and electronics required for its operation, while the supporting neck 16 may contain only AC or DC power wiring or, in an alternative embodiment, optical fibers 28 for conducting the return collected light from scanning of labels, and for delivering the collected light to alternative remote decoding electronics 30 indicated schematically as located in the base 18 of the scanner unit.

Figure 4:
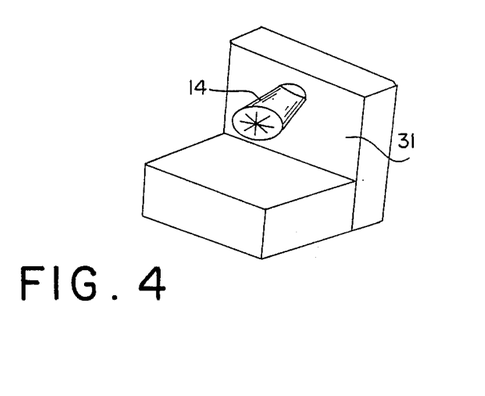
FIG. 4 is a view showing the scan head mounted in a fixed position to a vertical wall.

FIG. 4 shows an alternative arrangement with the scanner head 14 mounted in a fixed position, as on a vertical wall 31. Labeled items are moved to or past the scanner head 14. The mounting to the wall can be a swivelled or ball-jointed mounting if desired, affording some flexibility.

The compact size of the entire unit 10 and the adjustable neck 16 which enables the compact scanner head 14 to be oriented and swung to virtually any desired position are very important features of the invention. Scanners in accordance with these principles of the invention are extremely small in comparison to the built-in countertop scanner systems, and they can be installed simply by placing them in a desired position and connecting wiring to power, or alternatively to power and other computer-operated processing equipment which is connected to inventory and price related databases, etc. The operator of the scanner unit 10 can position the scanner head for his own maximum comfort in use of the scanner, resulting in a higher rate of first-time good reads.

The above principles are achieved by, and depend on, a compact and reliable design for scanner optics of the scanner head 14. FIGS. 5 through 11 show preferred embodiments of scanner optics for the scanner head 14.

The scanner head 14 preferably produces an "asterisk" type scan pattern 35. Such a pattern, as is known in the industry, includes a series of centrally intersecting scan lines 34 (see FIG. 2), and the term "asterisk" scan pattern is not limited to a specific number of such crossing scan lines. There may be three, four, five or even six or more such intersecting scan lines, depending on the need for coverage of a number of different scan line angles for reading labels in different orientations.

Further, although the ""asterisk" scan patterns shown and described herein are generally depicted as intersecting close to one common intersection point, this is not necessary and the term "asterisk" should not be taken to imply this.

Certain bar code labels have high aspect (height to width) ratios, for example up to 10 to 1, and such labels of course require that they be scanned by a scan line oriented almost parallel to the length of the bar code label. In accordance with the invention, such labels are reliably read by employing an asterisk scan pattern with an adequate number of scan lines, e.g. at least three or four, but also, in a preferred embodiment, by rotating the scan pattern as it is generated, at a relatively slow rate of speed.

One preferred optical arrangement for effecting the rotation of the asterisk scan pattern 35 defined by the scan lines 34 is illustrated and described below with reference to further drawing views.

Figure 5:
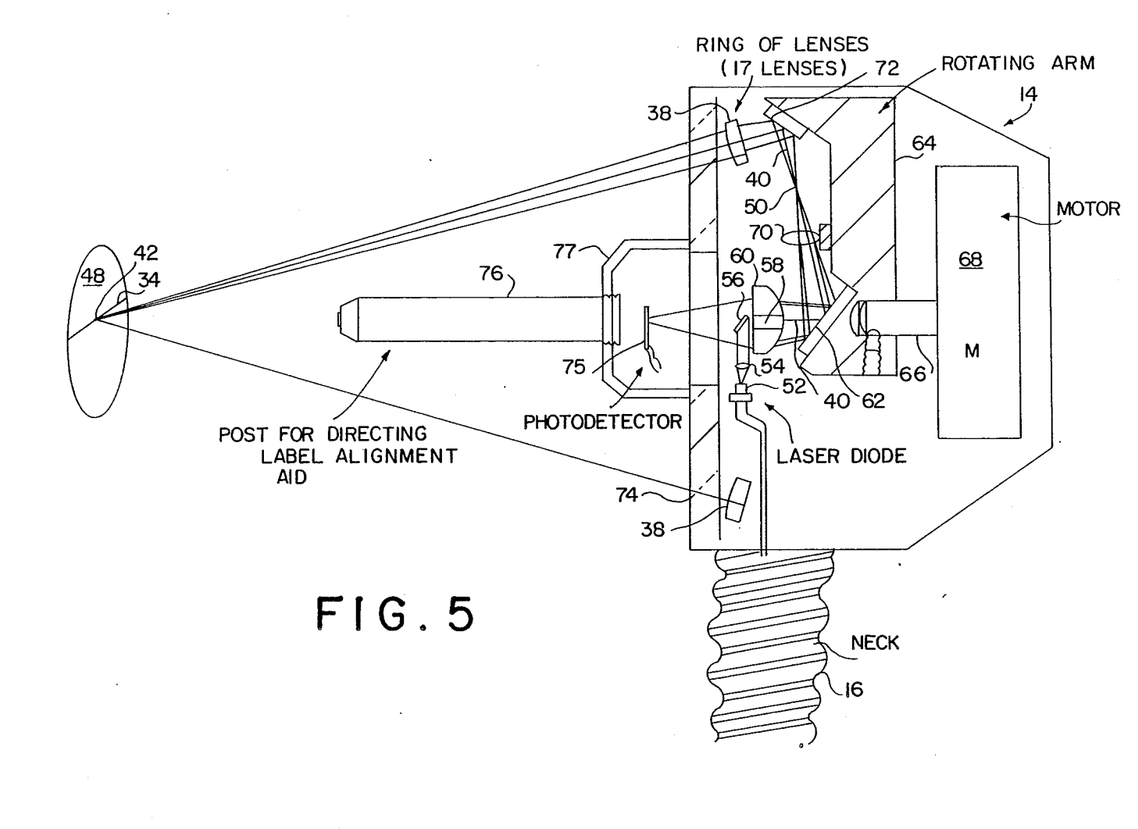
FIG. 5 is a sectional view in elevation, showing preferred construction of a scanner head in accordance with the invention, in assembled configuration.

FIG. 5 shows one preferred embodiment of a laser scanning head 14 of the present invention. In this embodiment the asterisk scan pattern is generated by an arcuately arranged array of lenses 38, across which a laser beam 40 sweeps. As illustrated, the sweeping laser beam 40 enters the back side of each of the array of positive lenses 38, and passes through each lens 38 to be focused toward a focal point 42 at the desired reading distance from the scanner head 14. The effect of the moving beam 40 sweeping across the lenses, as illustrated in FIG. 7, is to generate a scan line 34 by movement of the beam or spot 42 in the direction opposite that in which the beam 40 sweeps across the lenses 38.

Figure 7:
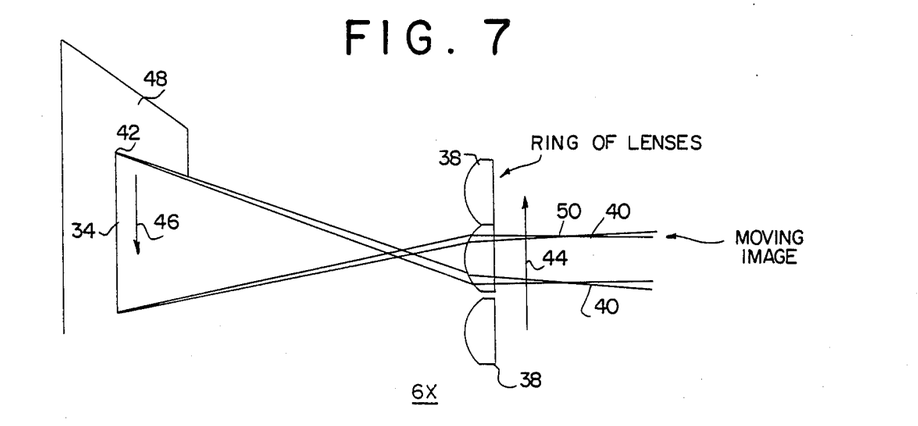
FIG. 7 is a schematic side view representation illustrating a principle of operation of one preferred embodiment of scanning optics.

In FIG. 7, directional arrows 44 and 46 indicate the respective directions of movement of the sweeping beam 40 across the positive lenses 38, and of the laser beam spot 42 in generating the scan line 34 on a package surface 48. The scan line 34 is also shown in schematic perspective at the left side of FIG. 5.

As also indicated in FIG. 7, in accordance with the invention the optics including the lenses 38 are such as to magnify the sweep of the beam 40 in forming the scan line 34 (which is actually an arc of large radius). The beam 40 approaching the back of the array of lenses 38 first converges to a beam waist 50 which is behind and relatively close to the positive lenses 38. This puts the focus or beam spot 42 at a much greater distance in front of the lenses 38, which distance may be about five inches in preferred embodiments of the invention. The image of the beam is magnified, as is the length of beam sweeping movement across the lens 38. This magnification factor may typically be about 6:1, but can have other values. Accordingly, a scan line 34 generated by these optics has a length approaching typically six times the width of each positive lens 38. This is one important feature which helps produce a scan pattern of useful size from a compact scanning head 14.

As can be further seen from the sectional view of FIG. 5, the laser beam 40 originates in a laser diode 52 preferably mounted in the scanning head 14 as schematically illustrated. Light from the diode 52 is focused by first positive lens 54 and is then reflected by an angled mirror 56 through one lens 58 (or a plain glass non-focusing portion) of a bifocal lens 60 which also serves as a collection lens, explained below. The laser beam 40, which is illustrated as the center light ray in FIG. 5, then strikes an obliquely angled mirror 62 which is mounted on an arm structure 64 mounted on a shaft 66 rotated by a motor 68 mounted in the scanner head 14.

As indicated in FIG. 5, the beam 40 may pass through a further positive lens 70, also mounted for rotation with the rotating arm 64, at an outboard position from the oblique mirror 62. The laser beam then goes through the beam waist 50 and is reflected off a peripheral mirror 72, also mounted on the rotating arm 64 at a far outboard position and oriented at a proper angle for directing the reflected beam through each of the array of convex or positive lens 38 as the arm 64 rotates. As shown in FIG. 5, the lenses 38 are positioned adjacent to a glass scanner window 74, through which the scan line generating beam passes.

The scanner optics of the scanner head 14 preferably include coaxial retro-directive return of collected light from the bar code being read. This is indicated as the broader band of light in FIG. 5, returning over a broader region of the same path which was traveled by the beam en route outward from the scanner to the bar code. The collected light is thus focused by the array lens 38, reflected by the outboard mirror 72, is converged somewhat by the positive lens 70 and is reflected off the rotary mirror 62. It then passes through the larger lens of the bifocal lens 60 and is focussed onto a photodetector 75, wiring from which passes through the neck 16 (wiring path not shown). This is one preferred arrangement, although the return collected light can be conducted down to the base by optical fibers as discussed above, so that the photodector is in the base rather than the head. The use of fiber-optics minimizes noise added to the photodetector signal by lengthy wires extending through the neck to signal processing and decoding electronics that can be located in the base.

FIG. 5 also shows an elongated cylindrical aiming post 76 supported from a cap member 77 secured to the scanner window 74. The aiming post 76 can help an operator to position a label at the best position and distance from the scanner head. The optics can be such that the focus of the pattern is just an inch or so from the end of the post.

Figure 8:
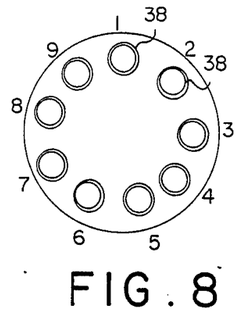
FIGS. 8 and 9 are companion views showing some elements and principles of scanning optics of the invention.
Figure 9:
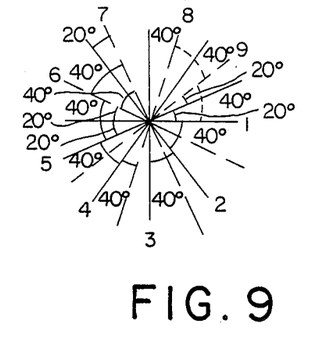

FIGS. 8 and 9 show schematically the series of lenses or optical elements 38 and the manner in which they generate the desired asterisk scan pattern. In particular, FIGS. 8 and 9 show an odd number of lenses 38 in a circular array, in this case nine lenses. The position of the sweeping laser beam across the lenses 38, in arcs which are slightly interrupted by the edges of the lenses, is illustrated in FIG. 8. Each lens in FIG. 8, for purposes of this discussion, is numbered 1 through 9, and a corresponding scan line, similarly numbered, is shown for each lens in FIG. 9.

As illustrated by FIGS. 8 and 9, the use, of an equally spaced array of an odd number of lenses produces a non-overlapping set of a high number of scan lines. Starting with lens and scan line No. 1, lines 1, 2, 3, 4 and 5 are generated in about one-half revolution of the scanning optics, i.e. one-half of a circular sweep of the laser beam arround the array of lenses. Scan lines Nos. 6, 7, 8 and 9 are interspersed between the scan line positions from the first half-revolution, shown in dashed lines in FIG. 9. Scan line No. 1 is again regenerated, following No. 9.

FIGS. 8 and 9 therefore show that nine (or any odd number of) uniquely positioned scan lines can be produced in this way, as opposed to, for example, the use of an even number of lenses 38 such as ten. In a ten-lens array, effectively only five scan lines would be produced, since five would be superimposed over the other five, assuming the lenses of the array are stationary and are symmetrically arranged around the circumference of a circle.

Figure 6:
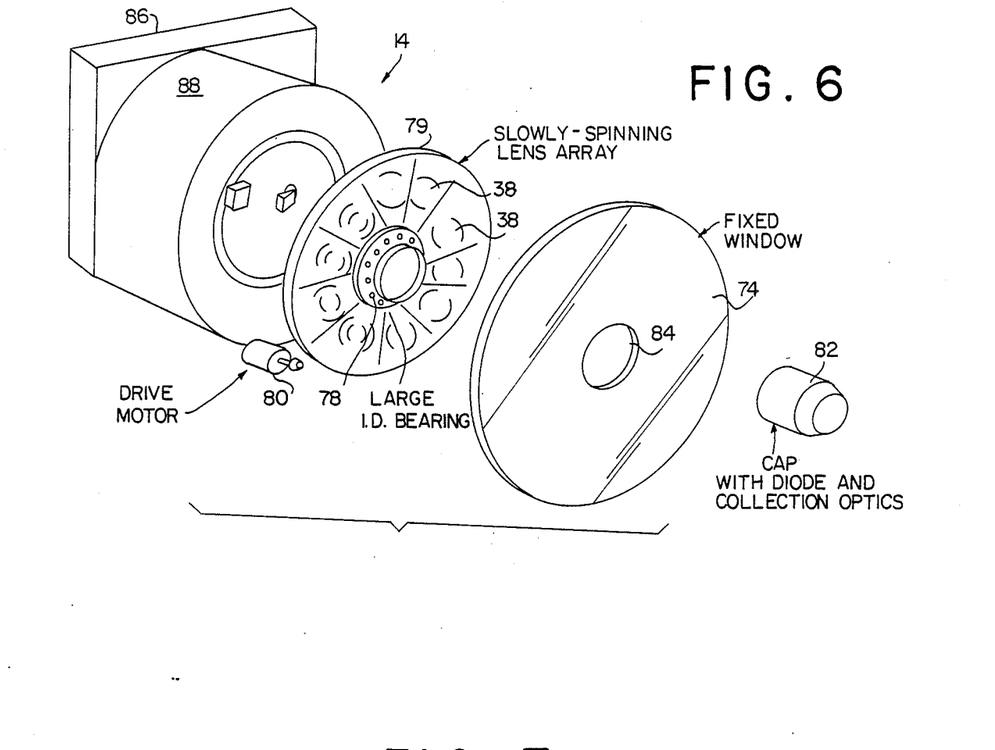
FIG. 6 is an exploded view in perspective, showing a slightly modified construction of a scanner head similar to that of FIG. 5.

However, as mentioned above, another feature of the invention is that the array of lenses 38 may be rotated slowly during the generation of the asterisk scan pattern, causing the scan pattern itself to rotate as it is generated. FIG. 6 shows the array of lenses 38 mounted on a rotation member or wheel 79 which is rotatable by a bearing 78 with a large central opening and a small drive motor 80 which engages the rotational wheel 79, directly or indirectly. The lens-mounting wheel 79 may be rotated at a relatively slow speed of about 30 rpm, for example.

Also shown in FIG. 6 is a front cap 82 for the scanner head 14, to fit against the fixed window 74 about a central opening 84 of the window. The front cap 82 can include the laser diode and collection optics, a construction which varies somewhat from what is shown in FIG. 5.

FIG. 6 also shows a rear portion 86 of a scanner housing 88, which can contain a printed circuit board for bar code decoding electronics, if desired. However, if a photodetector is positioned in the housing 88, or in the front cap 82, a signal from the photodetector can be conducted by wiring from the scanner head 14 down through the scan head supporting neck 16 (FIG. 5) and to decoding electronics in the base 18 (FIGS. 2 and 3) of the scanner assembly. Alternatively, the photodetector can be located in the base and fiberoptics can be used to bring the optical signal to it, as above.

Figure 10:
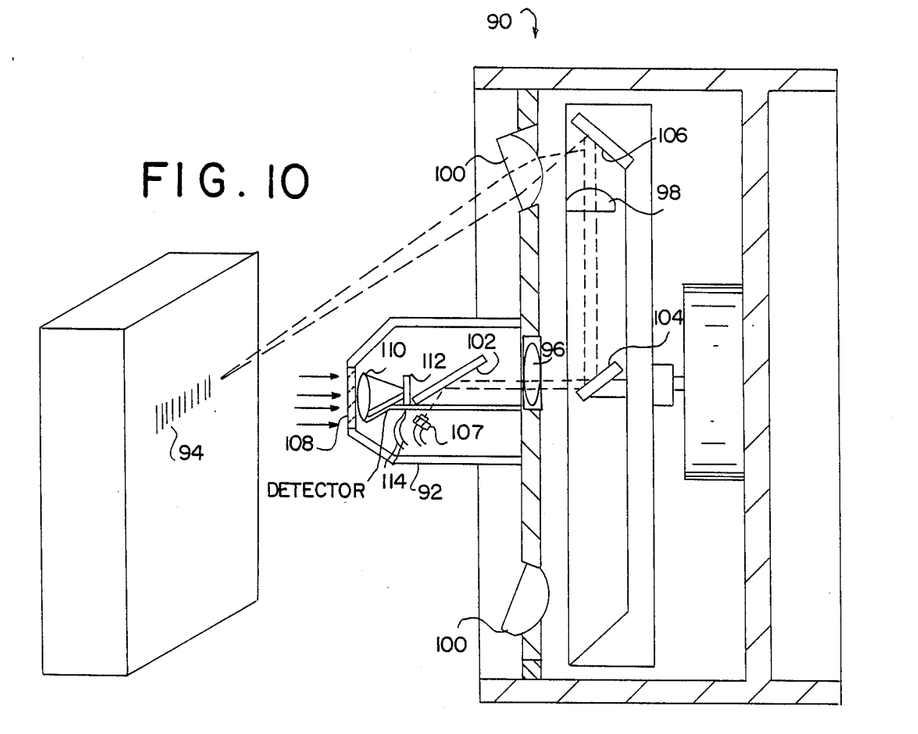
FIG. 10 is a sectional view similar to FIG. 5, but showing another embodiment of a scanner head according to the invention.

FIG. 10 shows another variation of the preferred embodiment of the invention, wherein a scanner has a front end cap or nose 92 which helps the operator position the label properly in front of the scanner head and also contains collection optics which receive light directly from the bar code label 94 which is in front of the cap 92. In this arrangement coaxial collection optics are not employed, and lenses 96, 98 and 100 and mirrors 102, 104 and 106 handle only the laser beam from a laser diode 107 en route to the label 94. As the beam is reflected from the bar code label 94, a portion of the reflected light goes through a front transparent window 108 in the cap 92, as indicated by arrows, and is focused by a lens 110 onto a photodetector 112. Lead wires 114 from the photodetector can then lead down through the scanner head 90 and through the neck of the scanner assembly to a base which can contain decoding electronics (not shown in FIG. 10).

In the embodiment shown in FIG. 10, the scan line magnifying lenses 100 are in a circular array but are not shown as being rotatable as in the scanner illustrated in FIG. 6. However, it should be understood that these lenses 100 can be on a rotation member as in FIG. 6, with the front cap 92 connected to a fixed window 74 as in the embodiment of FIG. 6.

Figure 11:
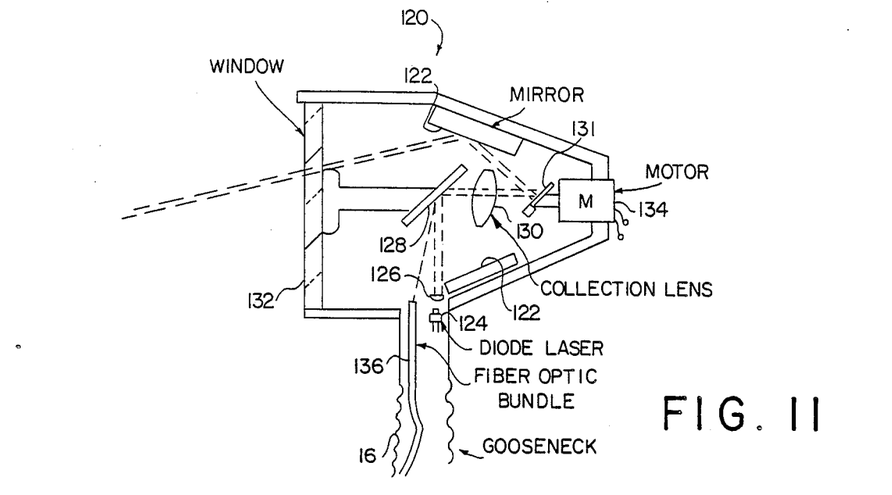
FIG. 11 is a sectional view similar to FIGS. 5 and 10, but showing a further embodiment of a scanner head with different scanning optics.

FIG. 11 shows another embodiment of the invention, wherein a scanner head 120 employs a circular array of mirrors 122 for generating the scan lines of the asterisk scan pattern rather than the array of positive lenses 38 (FIG. 5 and 6) or 100 (FIG. 10). In this form of asterisk scanner, a laser diode 124 sends a beam through a lens 126, which is reflected off a fixed mirror 128 and through a bifocal lens 130 to be reflected generally in a cone shape, forwardly and radially outwardly and revolving around the scanner head. The rotating beam strikes the array of mirrors 122, each of which reflect the moving beam to generate a slightly curved scan line at the location of the target, similar to the scan lines generated by the scan lines described above. The beam passes through a transparent front window 132 in the scanner head, as illustrated. The mirror 131 which sends the beam radially outwardly is driven by a motor 134.

In the scanner embodiment shown in FIG. 11, a fiber optic bundle 136 is indicated for receiving the collected light from the beam scanning across the bar code label. The fiber optic bundle 136 passes down through the goose neck scanner head support 16. However, a photodetector, as shown in FIGS. 5 and 10, can be positioned inside the scanner head 140 for receiving the collected light, with only wiring passing down through the neck 16, as discussed in connection with the previous embodiments.

The mirrors 122 can have plane surfaces or they can be concave for magnifying the effect of the sweeping beam and magnifying the length of each scan line in the asterisk pattern.

Figure 12:
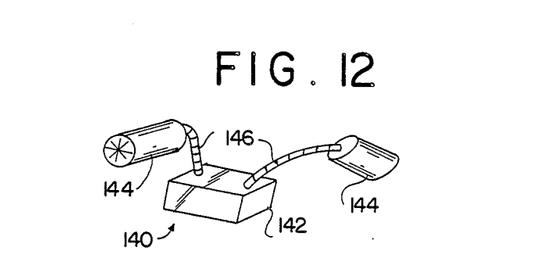
FIG. 12 is a perspective view showing a scanner with two scanning heads.

FIG. 12 indicates schematically a two-headed scanner 140 in accordance with the invention. The scanner 140 has a base 142 and a pair of scanner heads 144 which may be similar, each supported by a goose neck type flexible support 146 or other suitable flexible support from the base 142. As indicated, each of the scanner heads 144 generates an asterisk scan pattern. The double-headed scanner 140 is useful for reading of code labels by two operators at the same time. The common base and electronic box 142 may contain only one set of decoding electronics with each of the scan heads 144 active at different times, i.e. rapidly multiplexed.

Figure 13:
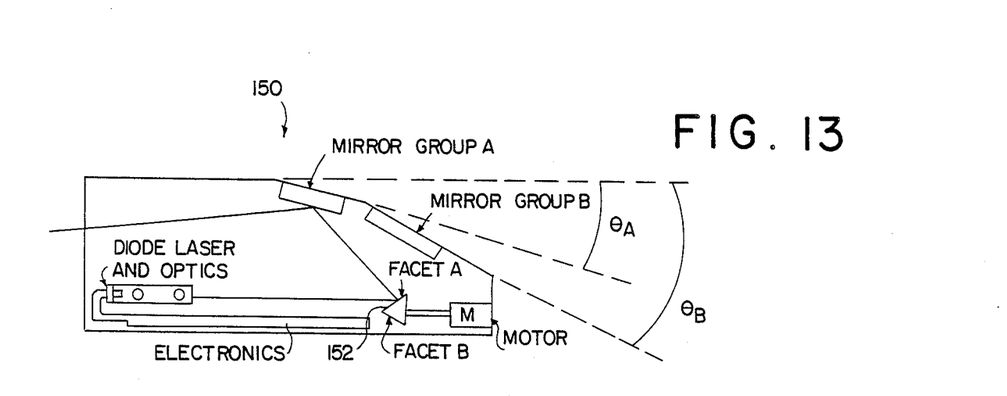
FIG. 13 is an elevational section view showing a further embodiment of a scanner wherein the scanner head is generally half-circular or half-cylindrical.

FIG. 13 shows in a simple schematic view a modification of the scanner head constructions of FIGS. 1–12, wherein the scanner head 150 generally defines a half-circle and half-cylinder. This enables a further reduction in size when needed. Essentially a full circle of asterisk-pattern scan lines can be generated by successive half-circle sweeps of the laser beam across two half-circle arcuate arrays of mirrors (Groups A and B). A two-faceted rotating polygon has each facet set at a different angle such that facet A directs the laser beam to mirror Group A, and facet B to mirror Group B. Angle $theta_a$ can be the same for all group A mirrors, and $theta_b$ for Group B, but $theta_a$ angles are different from $theta_b$ angles. Group A is offset around the half-circle periphery by about one-half the mirror width from Group B, for rotationally offsetting Group B's scan lines from Group A's in the asterisk pattern. It should be understood that in one possible embodiment, the half-circular scanner head 150 can have only one group of mirrors (Group A or Group B) in an arcuate array, with the two facets A and B of the mirror 152 having similar orientations. This will still produce an essentially full circle of scan lines in one-half revolution of the mirror 152 (see FIGS. 8 and 9 for example), but will result in retracing of the same scan lines in the second half revolution.

The lenses shown in the various embodiments of the invention described above can be convex lenses of conventional glass or plastic. It is also possible to use a holographic lens array in place of the conventional lenses illustrated.

In the case of the mirrors, such as the mirrors 122 shown in FIG. 11, these can either be conventional mirrors or "tunable" curvature mirrors formed with a membrane reflecting surface.

A further modification of the invention is to utilize two laser diodes in place of the one laser diode shown in the illustrated embodiment. In this case, each diode has a 50% duty cycle. The two laser diode beams can be focused slightly differently, so that one produces scan lines which focus at a somewhat greater distance from the scan head than the other. This increases the depth of field of the scanner for reading bar code labels.

It should also be understood that the scanning assemblies shown in the drawings, all utilizing laser diodes, have relatively low power requirements. Thus, they can be battery operated with onboard batteries, if desired.

Any of the scanner embodiments described herein can be combined with either or both of the following added features:

Nearby Electronic Article Surveilance (EAS) deactivator means can be triggered by the scanner each time a valid bar-code label is scanned to deactivate the EAS circuit imbedded in the same tag on which the bar-code label is printed.

The output from any scanner decoder can be interfaced to a radio-frequency (RF) transmitter to permit the decoded label information to be communicated over an RF link to a receiver that can serve one or many scanners.

Another feature of the invention is that there may be included means for relocating the beam waist of scan lines in the asterisk pattern. This adjustability of the beam waist location, and thus the focus distance of the scan lines, can be effected by controlling the axial position of the lens in the rotating arm member, such as the rotating arm 64 and the positive lens 70 shown in FIG. 4. Variations of the position of the lens 70 can be by piezoelectric or voice coil control. Alternatively, there can be included a membrane mirror such as at the position of the rotating mirror 62 spun by the motor, with means for adusting the membrane curvature for changing the focus of the beam leaving the mirror and thus adjusting the position of the beam waist.

If such a system is used in connection with a distance sensor, such as those used in auto focus cameras, the scan head can then accommodate the focus distance of the scan lines to the distance at which the labelled package is actually being held on the scan head. Thus the asterisk scan pattern could have a depth of field which is movable automatically in response to the actual position at which the package is placed when it is moved to or past the scanner head. This variation can easily be implemented with available components, and an example implementation is shown in FIG. 14.

Figure 14:
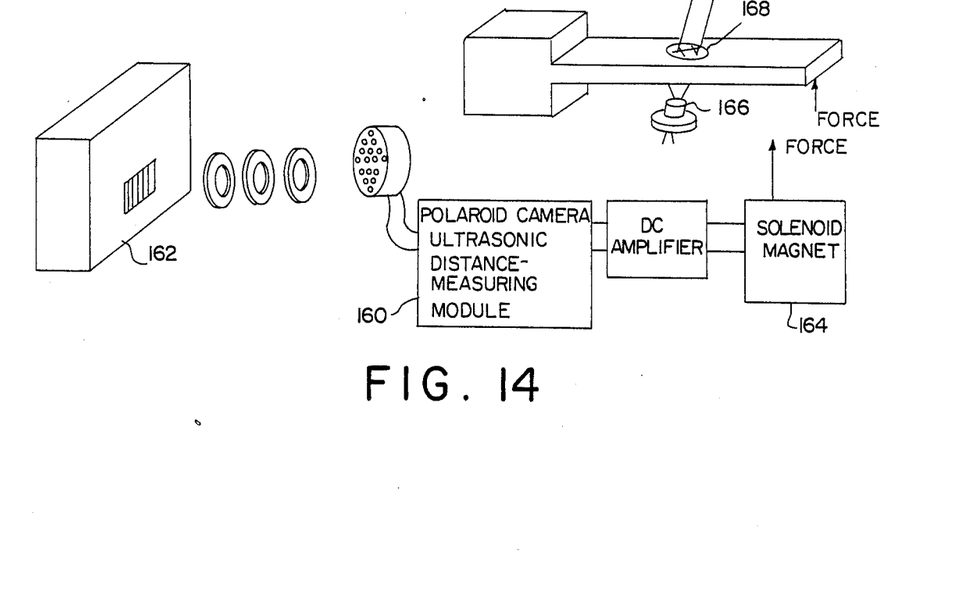
FIG. 14 is a schematic representation, partly in block diagram form, showing an example implementation of a beam waist adjustment system which may be included in the invention.

FIG. 14 shows an ultrasonic distance-measuring module 160, such as available from the Polaroid Corporation, used to measure the distance to the package 162 whose label is to be read. The output signal can be converted to current which drives a solenoid magent 164, which in turn adjusts the distance between the diode 166 and a lens 168 to provide the best beam for reading a label at that distance.

Figure 15:
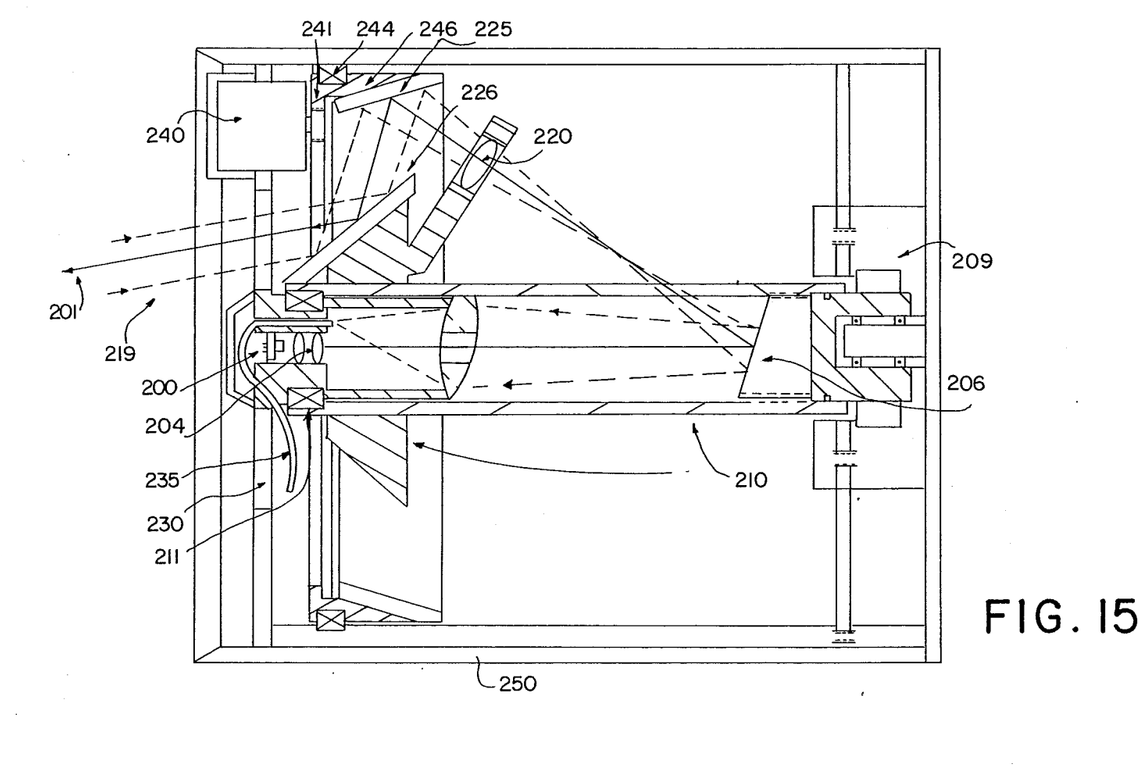
FIG. 15 is an elevational section view showing another embodiment of an asterisk-pattern scanning having an array of rotating mirrors.

FIG. 15 is another view in sectional elevation of an asterisk scanner or scanner head 198 which uses an array of mirrors to produce an asterisk-scan pattern. The scanner 198 has a laser diode 200 which produces a laser beam 201 through a collimating lens 204 as illustrated. The beam 201 passes through a positive lens 205 which is a collection lens and may by a "bifocal" type lens whereby the beam 201 in unaffected. The beam is then reflected off a first spindle mirror 206 on a rotating spindle 210 which is driven by a spindle motor 208.

The rotating spindle 210 rides on a spindle bearing indicated at 211. The beam is reflected obliquely from the spindle mirror 206, such that a generally cone shaped beam sweep is generated. The beam passes through a spindle lens 220 which is rotating with the spindle 210 and thus is stationary with respect to the spindle mirror 206 from which the beam has just been reflected. Again, the spindle lens 220 may only affect the returning collected light, which is indicated in dashed lines at 219.

The beam next strikes an obliquely oriented mirror 225 of an arcuate array of mirrors. In this sense, the scanner shown in FIG. 15 is similar to the scanner 120 shown in FIG. 11—the line segments which will become the scan lines of the asterisk scan pattern are generated by an arcuate array of discrete mirrors 225, rather than by an array of positive lens as in other embodiments.

The sweeping beam 201 then returns from each array mirror 225 generally toward center and the sweeping line is reflected off a spindle mirror 226 which rotates with the spindle, along with the first spindle mirror 206 and the collection lens 220. Thus, the beam 201 exiting through a scanner window 230 is in the form of successive sweeping lines of the beam each generated by an array mirror 225 and each successively changing orientation so as to produce the desired asterisk scan pattern.

An efficient asterisk scan pattern is generated with the system as just described. However, in order to achieve a rotating asterisk scan pattern so as to assure that product orientation will not be needed as discussed above and as described with respect to FIG. 6, the mirror array 225 may be slowly rotated. To this end, the array of mirrors 225 is shown mounted on an array holder 246 mounted in the scanner by a bearing 244. A motor 240 drives the mirror holder and array in slow rotation, via a small gear 247 which engages with complimentary gear teeth on the mirror array holder 246. The bearing 244 preferably comprises a circular array of ball bearings or roller bearings, mounted against an outer housing 250 of the scanner.

The return collected light, indicated at 219, is shown as a wide volume of light passing through the scanner window 230 and reflecting off the spindle mirror 226, then off an array mirror 225 and through the spindle lens 220 which causes the light to converge as indicated. The collected light is then reflected off the first spindle mirror 206 and then, while diverging, passes through the collection lens 205 and is focused down to an appropriate detection device. As illustrated, this may be a fiber optic bundle 235, which conveys the collected light down to a photodector, not shown.

As can be envisioned from FIG. 15, the laser diode 200 and collimating lens 204, as well as the fiber optic bundle 235, as well as the collection lens 205 are in a stationary portion 251 of the scanner, about which the spindle 210 rotates.

As explained below with reference to FIG. 16, the general arrangement of array mirrors 225 and spindle mirrors 206 and 226 can be used to cancel curvature in the resulting asterisk scan lines, which would ordinarily occur in this general type of arrangement.

Figure 16:
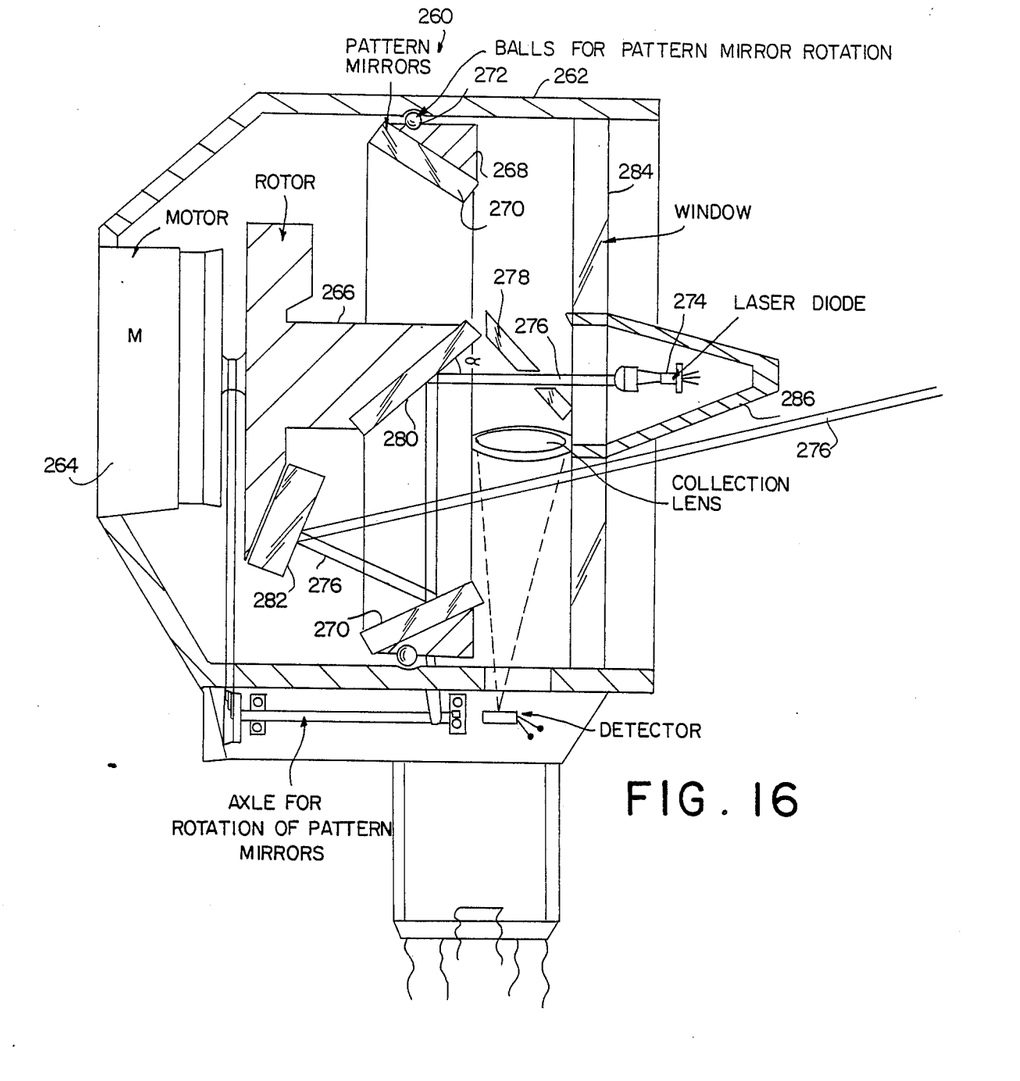
FIG. 16 is an elevational section view showing another embodiment of an asterisk-pattern scanner according to the invention, again having an array of rotating mirrors.

FIG. 16 shows a variation of the scanner 198 of FIG. 15, with provision for cancelling scan line curvature to produce virtually straight asterisk pattern scan lines. A scanner or scanner head 260 of FIG. 16 has a scanner housing or outer casing 262 serving much the same function as the casing 250 of FIG. 15, with a motor 264 driving a spindle 266 and also driving, at a different and slower rotational speed, a slowing rotating mirror array 268 having array mirrors 270. The mirror array body 268 may be supported with ball bearings 272 with respect to the housing 262, as illustrated.

A diode laser 274 produces a beam 276 which is appropriately collimated and which passes generally down the axis of the spindle and of the rotating array 268. The beam passes through a beam splitter mirror 278 and is reflected off a first spindle mirror 280. If the spindle mirror 280 were precisely at 45 degrees, and if the beam were exactly along the axis of the spindle, a plane of the sweeping beam would be generated. Such a plane would produce straight scan lines.

By tipping the mirror off 45 degrees in one direction or the other (40 degrees in a preferred embodiment), the scanning plane becomes a cone of either positive or negative sign. In the embodiment of FIG. 16, the beam reflected from the spindle mirror 280 forms a conical surface with the angle alpha being somewhat off 45 degrees.

The conical surface goes through a mirror 270 which is essentially fixed (the slowly rotating mirror array 268 can be assumed essentially fixed for this discussion). As seen in the figure, the scanning beam 226 hits the array mirror 270 and then that slightly curved scanning plane of light hits another mirror 282 on the spindle 266. The spindle mirror 266 is the final mirror, nearly perpendicular to the axis of the spindle. If it were precisely perpendicular, then the scanning beam that reflects from the mirror 282 would be of the same shape as the beam that is going into the mirror. The effect of this mirror 282 would be the same as that of a large background mirror not rotating. By the tipping of this final mirror 282 in one direction, the mirror is caused to contribute positive or negative curvature to the resulting scan line, and that will cancel the previous curvature induced by the mirror 280; with proper tilt, the resulting beam will be straight. There is a mathematical relation to arrive at straightness, but it can easily be achieved by experimentation with the angulation of the mirrors 280 and 282.

It can be seen that oblique angles of the array mirrors 270 and of the final reflecting spindle mirror 282 are necessary, in order to project the beam 276 out through the scanner window 284, i.e. between the center nose cone 286 and the array of mirrors 270. If the spindle mirror 280 and array of mirrors 270 were at 45 degrees and the spindle mirror 282 were at 90 degrees to the axis of rotation, the beam would not be able to emerge from the housing. The tilt of the mirrors 280 and 282 must be selected, and selected relative to one another, such that the scan line curvature is essentially cancelled out and the angle at which the beam 276 emerges from the scanner window allows the asterisk scan pattern to be generated at a desired distance from the scanner. Thus, in the design of the scanner 260, the selection of the mirror tilt angles must first be made such that the beam will emerge from the housing; second, the scan line should be convergent toward the center axis of the scanner, as shown in FIG. 16, such that the scan lines generally or approximately intersect, if an asterisk-like scan pattern is to be achieved. Third, the tilt angles of the mirrors 280 and 282 must be coordinated so as to complement each other, to substantially cancel all curvature from each scan line at the intersection of the scan lines in space, for optimum scanning.

For a given motor rotation angle, the length at the scan line is dependent on the distance to the target. The folding of the beam within the instrument allows a greater scan line length for a given instrument size. The result is that a very compact design is achieved.

Figure 17:
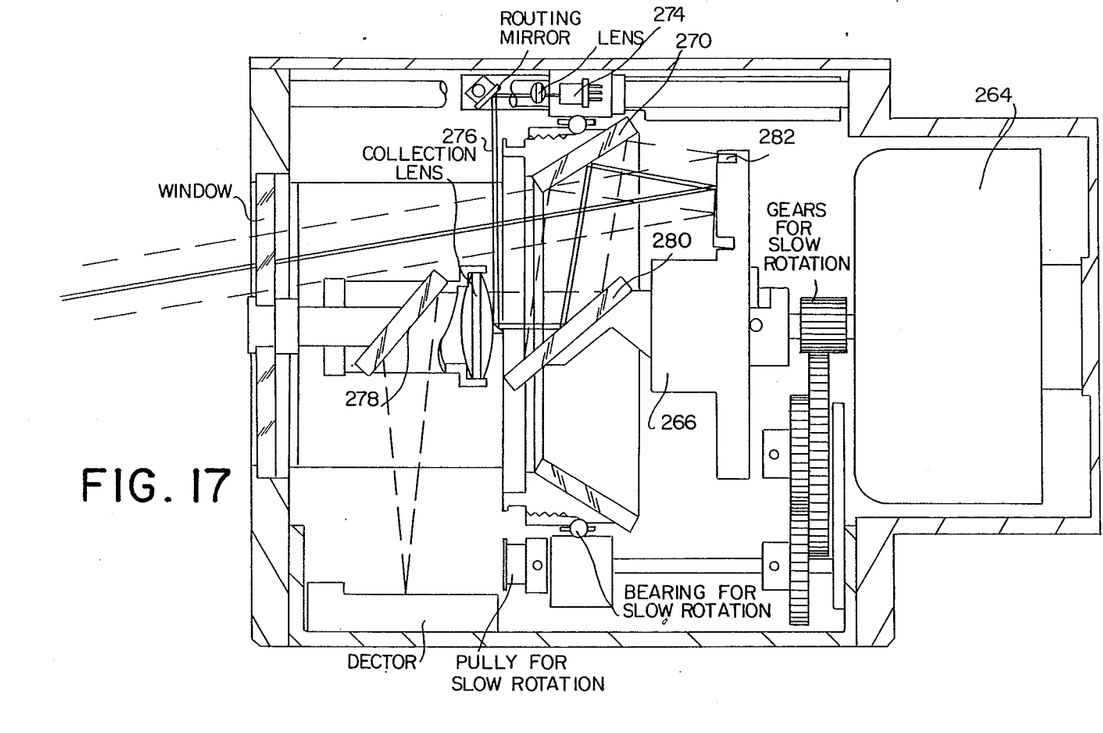
FIG. 17 is a view similar to FIG. 16, but showing preferred relationships of components in one preferred embodiment.

FIG. 17 is similar to FIG. 16, but shows preferred angles and other relationships in one embodiment. FIG. 17 is represented to scale to show the relationships of this preferred embodiment.

Scanners in accordance with FIGS. 16 and 17 have been built with a diameter no greater than 3½ inches and with a main head depth of about 3½ inches, and they have proven effective. In such a compact design any scan line curvature tends to become more pronounced and critical (particularly for high aspect ratio bar codes) and thus the described straight line producing optics become very important.

While we have illustrated and described the preferred embodiments of our invention, it is to be understood that these are capable of variation and modification and we therefore do not wish to be limited to the precise details set forth but desire to avail ourselves of such changes and alterations as fall within the purview of the following claims.

What is claimed is:

1. A compact versatile laser bar code scanner, comprising, a scanner head having means for scanning and detecting returned scattered light from a laser beam generally in an asterisk pattern focused a distance in front of the head such that a bar-coded item or package can be moved manually to or past the scanner head to conveniently scan a bar code label on the item or package with the scanner, substantially without the need for label orientation by the user, flexible head support means connected to the scanner head for adjusting the position and angle of the head in three-dimensional space, and a base connected to the flexible head support means.

2. The scanner of claim 1, wherein the flexible head support means comprises a gooseneck type flexible column.

3. The scanner of claim 1, wherein the flexible head support means comprises a flexible column with a plurality of pivot joints in different axis orientations.

4. The scanner of claim 1, wherein all electronics to operate the scanner are contained in the head.

5. The scanner of claim 1, including a laser diode as a laser source.

6. The scanner of claim 4, wherein the laser diode is positioned generally in the scanner head.

7. The scanner of claim 6, including fiber optic means for conducting return collected light through the flexible head support means, and including decoding electronics in the base, receiving said return collected light from the fiber optic means.

8. The scanner of claim 6, including collected light return means in the scanner head, including a photodetector receiving focussed return collected light, and including decoding electronics in the base and wiring in the neck connecting the photodetector with the decoding electronics.

9. The scanner of claim 1, wherein the means for scanning in an asterisk pattern comprises a laser diode, a rotating mirror positioned obliquely in the path of a laser beam from the laser diode and rotating on an axis which generally passes through the asterisk scan pattern, and an array of mirrors obliquely positioned around the axis of rotation such that they receive the light from the rotating mirrors and reflect the light to generate the asterisk scan pattern, with each mirror of the array generating a scan line of the asterisk pattern.

10. The scanner of claim 9, wherein the array of mirrors are positioned to define a full circle around the axis of rotation of the rotating mirror.

11. The scanner of claim 9, wherein the array of mirrors are positioned to define a portion of a circle around the axis of rotation of the rotating mirror, and wherein the rotating mirror comprises at least two reflecting facets to direct the sweeping laser beam over said array of mirrors without excessive dead time.

12. The scanner of claim 1, wherein the means for scanning in generally an asterisk pattern includes means for rotating the asterisk scan pattern as it is generated, so that even labels of high aspect ratio are easily read.

13. The scanner of claim 1, wherein the means for scanning in generally an asterisk pattern includes positive lens means in the path of the laser beam for projecting and magnifying a generated beam scan line of the asterisk pattern with substantial magnification, such that the sweep of the laser beam is magnified and such that the scan line is accurately located in the asterisk scan pattern.

14. The scanner of claim 13, including means for producing a beam waist relating closely behind the positive lens means, so that a forward focal point of the beam is positioned relatively far ahead and greater magnification is achieved.

15. The scanner of claim 1, wherein the means for scanning a laser beam generally in an asterisk pattern comprises a laser diode as a laser source, a rotating mirror positioned obliquely in the path of a laser beam from the laser diode, producing a sweeping generally radial beam of light, optical means in the path of the beam downstream of the rotating mirror for focusing the beam and for redirecting it generally in the direction of the asterisk scan pattern being produced, and an arcuate array of optical elements with means for magnifying the resulting scan lines in the asterisk pattern as the beam sweeps across the optical element.

16. The scanner of claim 15, including a rotating arm on which the rotating mirror is mounted, and wherein the optical means in the path of the beam comprises a focusing lens mounted on the arm radially outward from the rotating mirror for focusing the beam to a waist, a peripheral mirror mounted obliquely on the arm at an outward position on the arm, positioned to redirect the beam generally in the direction of the asterisk scan pattern being produced, and an array of positive lenses positioned in an arcuate pattern about the axis of rotation of the arm and not movable with the arm, for receiving segments of the sweeping beam from the arm and projecting from each positive lens a magnified scan line as a component of the asterisk scan pattern.

17. The scanner of claim 16, wherein the array of positive lenses each effect a magnification of about 6 to 1.

18. The scanner of claim 15, further including pattern rotating means for rotating the asterisk scan pattern as it is generated.

19. The scanner of claim 18, wherein the pattern rotating means comprises a bearing-mounted rotation member upon which said arcuate array of optical elements are mounted, and motor means for rotating the rotation member at a relatively slow rate of speed effective, considering the number of scan lines in the asterisk scan patten, to substantially assure that a bar code of high aspect ratio, up to about 10 to 1, will be read when moved through or presented to the asterisk scan pattern at a normal rate of movement, without need for deliberate label orientation by the operator.

20. The scanner of claim 15, including two laser diodes as laser sources, with beams from the two laser diodes producing two separate said sweeping generally radial beams of light following the same path but separated angularly by an integral multiple of one-half of the angular period from center to center of said optical elements, whereby a substantially constant generation of scan lines results, with minimum temporal interruption between generation of successive lines in the asterisk scan pattern.

21. The scanning of claim 1, further including means for adjusting said distance in front of the head at which the pattern is focused, in response to the actual distance of a bar-coded item or package in front of the head.

22. A laser bar code scanner for generating an asterisk scan pattern, comprising,
  a scanner body,
  a laser diode in the scanner body as a laser source,
  a rotating mirror positioned obliquely in the path of a laser beam from the laser diode, producing a sweeping generally radial beam of light,
  optical means in the path of the beam downstream of the rotating mirror for focusing the beam and for redirecting it generally in the direction of the asterisk scan pattern being produced,
  an arcuate array of optical elements with means for magnifying the resulting scan lines in the asterisk pattern as the beam sweeps across the optical elements, and
  collection and decoding means for collecting return reflected light from the bar code and for electronically decoding the bar code.

23. The scanner of claim 22, including a rotating arm on which the rotating mirror is mounted, and wherein the optical means in the path of the beam comprises a focusing lens mounted on the arm radially outwardly from the rotating mirror for focusing the beam to a waist, a peripheral mirror mounted obliquely on the arm at an outward position on the arm for movement with the arm, positioned to redirect the beam generally in the direction of the asterisk scan pattern being produced, and the arcuate array of optical elements comprising an array of positive lenses positioned in an arcuate pattern about the axis of rotation of the arm, not rotatable with the arm, for receiving segments of the sweeping beam from the peripheral mirror and projecting from each positive lens a magnified scan line as a component of the asterisk scan pattern.

24. The scanner of claim 22, further including pattern rotating means for rotating the asterisk scan pattern as it is generated.

25. The scanner of claim 24, wherein the pattern rotating means comprises a bearing-mounted rotation member upon which said arcuate array of optical elements are mounted, and motor means for rotating the rotation member at a relatively slow rate of speed effective, considering the number of scan lines in the asterisk scan patten, to substantially assure that a bar code of high aspect ratio, up to about 10 to 1, will be read when moved through the asterisk scan pattern at a normal rate of movement, without need for deliberate label orientation by the operator.

26. The scanner of claim 22, including two laser diodes as laser sources, with beams from the two laser diodes producing two separate said sweeping generally radial beams of light following the same path but separated angularly by an integral multiple of one-half of the angular period from center to center of said optical elements, whereby a substantially constant generation of scan lines results, with minimum temporal interruption between generation of successive lines in the asterisk scan pattern.

27. The scanner of claim 22, wherein the optical means include means for forming a beam waist of best focus, and the scanner further including beam waist adjustment means associated with the optical means, for adjusting the distance of the beam waist from the scanner body in response to the actual distance of a package from the scanner body.

28. The scanner of claim 27, wherein the beam waist adjustment means comprises an ultrasonic distance measuring module on the scanner and focus adjusting means connected to the distance measuring module for shifting the optical means to move the beam waist farther from or closer to the scanner in response to measurement of the distance of a package from the scanner, so that the beam waist occurs substantially at the package.

29. A laser bar code scanner for generating an asterisk scan pattern, comprising,
  a scanner body,
  a laser diode in the scanner body as a laser source,
  a rotating mirror positioned obliquely in the path of a laser beam from the laser diode and rotating on an axis which generally passes through the asterisk scan pattern,
  an array of mirrors obliquely positioned around the axis of rotation such that they receive the sweeping beam of light from the rotating mirror and reflect the light to generate the asterisk scan pattern, with each mirror of the array generating a scan line of the asterisk pattern, the array of mirrors being positioned to define generally a portion of a circle around the axis of rotation of the rotating mirror, and the rotating mirror comprising at least two reflecting facets to direct the sweeping laser beam over said array of mirrors without excessive dead time, and
  collection and decoding means for collecting return reflected light from the bar code and for electronically decoding the bar code.

30. The scanner of claim 29, including two separate arrays of mirrors in generally parallel arcuate arrays, and wherein the two reflecting facets on the rotating mirror are set at different angles, one facet oriented to swing a beam across the first array of mirrors and the other oriented to swing a beam across the second group of mirrors.

31. The scanner of claim 30, wherein the mirrors of the two arrays are oriented so as to produce scan lines which all intersect in generally the same location.

32. The scanner of claim 30, wherein the mirrors of the first array are offset along the arcuate array from the mirrors of the second array, so that the scan lines from the first array of mirrors are rotationally offset from the scan lines from the second array of mirrors.

33. A laser bar code scanner for generating an asterisk scan pattern, comprising,
  a scanner body,
  a laser diode in the scanner body as a laser source,
  a rotating mirror positioned obliquely in the path of a laser beam from the laser diode and rotating on an axis which generally passes through the asterisk scan pattern,
  mirror means for receiving the sweeping beam of light from the rotating mirror and for producing the asterisk scan pattern, including an array of mirrors set at oblique angles and positioned around the axis of rotation of the rotating mirror so as to receive the sweeping beam of light from the rotating mirror, with each mirror of the array forming a segment of beam scan which becomes a scan line of the asterisk scan pattern, a curvature correction means associated with the mirror means for removing curvature from the scan lines so as to produce substantially straight scan lines, and collection and decoding means for collecting return reflected light from a bar code and for electronicaly decoding the bar code.

34. The laser bar code scanner of claim 33, wherein the mirror means comprise, in addition to said array of mirrors, a final reflecting mirror angled obliquely with respect to the rotational axis and spaced radially outwardly from the rotational axis and on a common spindle with the rotating mirror, and the curvature correction means comprising said rotating mirror and said final reflecting mirror being adjusted in tilt such that with the rotation of the spindle they cancel substantially all curvature from the scan lines.

35. The laser bar code scanner of claim 34, further including pattern rotating means for rotating the asterisk scan pattern as it is generated, comprising means for slowly rotating the array of mirrors with respect to the spindle rotation.

36. The scanner of claim 33, wherein the optical means include means for forming a beam waist or best focus, and the scanner further including beam waist adjustment means associated with the optical means, for adjusting the distance of the beam waist from the scanner body in response to the actual distance of a package from the scanner body.

37. The scanner of claim 36, wherein the beam waist adjustment means comprises an ultrasonic distance measuring module on the scanner and focus adjusting means connected to the distance measuring module for shifting the optical means to move the beam waist farther from or closer to the scanner in response to measurement of the distance of a package from the scanner, so that the beam waist occurs substantially at the package.

38. The scanner of claim 33, wherein the scanner body has a maximum diameter of about 3½ inches.

39. A compact, versatile laser bar code scanner, comprising, a scanner head having means for scanning a laser beam in a pattern focused a distance in front of the head such that a package can be moved manually to or past the scanner head to conveniently scan a bar code label on the package with the scanner, flexible head support means connected to the scanner head for adjusting the position and angle of the head in three-dimensional space, the flexible head support means comprising a gooseneck type flexible column, and a base connected to the flexible head support means.

40. The scanner of claim 39, wherein all electronics to operate the scanner are contained in the head.

41. The scanner of claim 39, including a laser diode as a laser source.

42. The scanner of 41, wherein the laser diode is positioned generally in the scanner head.

43. The scanner of claim 42, including fiber optic means for conducting return collected light through the gooseneck type flexible column, and including decoding electronics in the base, receiving said return collected light from the fiber optic means.

44. The scanner of claim 42, including collected light return means in the scanner head, including a photodetector receiving focussed return collected light, and including decoding electronics in the base and wiring in the gooseneck type flexible column connecting the photodetector with the decoding electronics.

45. A compact, versatile laser bar code scanner, comprising, a scanner head having means for scanning a laser beam in a pattern focused a distance in front of the head such that a package can be moved manually to or past the scanner head to conveniently scan a bar code label on the package with the scanner, flexible head support means connected to the scanner head for adjusting the position and angle of the head in three-dimensional space, the flexible head support means comprising a flexible column with a plurality of pivot joints in different axis orientations, and a base connected to the flexible head support means.

* * * * *